United States Patent [19]

Ishikawa et al.

[11] 4,133,560
[45] Jan. 9, 1979

[54] PLUG AND ATTACHING HOLE THEREOF

[75] Inventors: Masakazu Ishikawa; Tsutomu Chuwman, both of Toyota, Japan

[73] Assignee: Toyota Jidosha Kogyo Kabushiki Kaisha, Japan

[21] Appl. No.: 804,926

[22] Filed: Jun. 9, 1977

[30] Foreign Application Priority Data

Jun. 28, 1976 [JP] Japan .................. 51-83955[U]

[51] Int. Cl.² .................. B65D 51/16; F16L 5/02; F16L 41/08
[52] U.S. Cl. .................................. 285/81; 220/293; 220/303; 285/158; 285/203; 285/209; 403/349
[58] Field of Search .............. 137/72, 74; 220/89 B, 220/303, 298, 293, 297, 301; 285/201, 202, 203, 209, 210, 158, 81; 217/107, 101, 113; 403/349, 348, 243

[56] References Cited

U.S. PATENT DOCUMENTS

| 652,858 | 7/1900 | Nadorff | 217/107 |
| 989,901 | 4/1911 | Foley | 220/89 B |
| 1,131,399 | 3/1915 | McGinley | 285/203 |
| 1,841,523 | 1/1932 | Crowe et al. | 220/293 |
| 2,361,704 | 10/1944 | Patterson | 220/293 |
| 3,468,565 | 9/1969 | Roder | 285/203 |

Primary Examiner—William Price
Assistant Examiner—Allen N. Shoap
Attorney, Agent, or Firm—Kane, Dalsimer, Kane, Sullivan and Kurucz

[57] ABSTRACT

A plug and its attaching hole for use in removably securing an accessory to a pressure container. This plug includes a head portion and a reduced diameter or shank portion continuous with the undersurface of the former. Build-up portions are formed on the outer peripheral surface of the shank portion, while cut-away portions are provided in the peripheral edge of the plug-attaching hole defined in the wall of the pressure container. Upon insertion of the shank portion of the plug into the plug-attaching hole, the build-up portions formed on the outer peripheral surface of the shank portion of the plug are mated with the cut-away portions, and then the plug is turned through a given angle so that the build-up portions may engage the inner peripheral edge surface of the plug-attaching hole provided in the wall of the pressure container. This prevents the plug from being blown away from the pressure container, even if a weld formed around the head portion of the plug on an outer surface of the wall of the container is failed or broken due to deterioration.

6 Claims, 3 Drawing Figures

PLUG AND ATTACHING HOLE THEREOF

This invention relates to a plug and its attaching hole, and more particularly to a plug which is interposed between an accessory and a pressure container, when securing the former to the latter.

In general, a pressure container such as a pressure tank, which contains pressurized air to be supplied to a pneumatic or air brake, an air booster, or the like, is equipped with a safety valve adapted to relieve an excessive internal pressure, when an internal pressure exceeds a given pressure level, a drain cock for draining water from a pressure container, a low-pressure switch adapted to give a warning, when an internal pressure in a container exceeds a given pressure level, a blank cap and the like. This accessory or air tank should be preferably attached to a pressure container removably. A plug of the type described finds its particular use.

A prior art plug comprises a head portion, a columnar, reduced diameter portion continuous with the head portion, and a tapped hole extending through the head portion and shank portion. A shank portion of a plug, when the plug is attached in position, is inserted into a plug-attaching hole provided in the wall of a pressure container, and then an outer periphery of the head portion is welded to a peripheral edge portion of the plug-attaching hole provided in the wall of the pressure container.

Thereafter, a threaded portion of an accessory is removably screwed into a tapped hole in the plug for attachment. However, the prior art plug itself, as has been described, is merely welded to a pressure container around the outer periphery of a head portion of the plug. Accordingly, if a weld thus formed is failed or broken due to deterioration and the like, then the plug and accessory secured thereto are blown away from the pressure container due to its high pressurized air.

This is particularly true with a plug for use with an air tank containing pressurized air to be supplied to an air brake in a motor vehicle, because the plug undergoes consistent vibrations of a vehicle running. Thus, if a plug is unfortunately detached from an air tank, then pressurized air is momentarily bled from the air tank, thus impairing to the safety of a vehicle. In addition, the air tank is normally exposed from the frame of a vehicle, so that if the plug is blown away from the tank, then a pedestrian would be injured. Particularly, a plug for a blank cap is located in a position accessible from the exterior of a motor vehicle for ease of inserting a tube or the like, so that such an accident would possibly lead to injury of a human being.

It is accordingly an object of the present invention to provide a plug and its attaching hole for use with a pressure container, which prevent such an accident due to a plug being blown away from a pressure container.

According to the present invention, there are provided a plug and its attaching hole, in which build-up portions are formed on the outer peripheral surface of a reduced diameter or shank portion of the plug, while cut-away portions are provided in a peripheral edge portion of a plug-attaching hole, with the sizes and shapes thereof being complementary to those of the build-up portions. In operation, a shank of the plug is inserted into a plug-attaching hole provided in a wall of a pressure container, with the build-up portions being mated with the cut-away portions, and then the plug is turned so as to bring the build-up portions into engagement with the inner peripheral-edge surface of the plug-attaching hole, and then an outer periphery of a head portion of the plug is secured to the wall of the pressure container hermetically.

According to a plug and its attaching hole of the invention, the build-up portions of the plug engages an inner peripheral edge portion, of a plug-attaching hole provided in a wall of a pressure container interiorly thereof, so that even if a weld formed around the head portion of the plug is failed or broken due to deterioration, the plug will not be blown away from the container, nor will be bled pressurized air from the pressure container momentarily.

These and other objects and features of the present invention will be apparent from a reading of an ensuing part of the specification in conjunction with the accompanying drawings which indicate one embodiment of the invention, in which.

Figure 1:
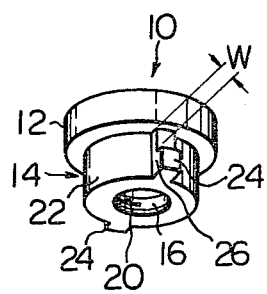
FIG. 1 is a perspective view of a plug according to the present invention.

Referring now to FIG. 1, there is shown at 10 a plug according to the present invention. The plug 10 includes a head portion 12 of a circular shape, and a shank portion 14 extending from the undersurface of the head portion 12 coaxially. A tapped hole 16 extends through the head portion 12 and shank portion 14 along the axis thereof. The tapped hole 16 is provided with a female thread 20 in its wall surface. Thus, upon securing of an accessory to the plug, a male-threaded coupling portion 18 of an accessory is screwed into the tapped hole 16, as shown in FIG. 3.

Stepped ridge portions 26 are formed on the outer periphery surface 22 of the shank portion 14 of the plug 10, and include build-up portions 24 and recessed portions as viewed in axial direction thereof, with the build-up portion being spaced a given distance W from the undersurface of the head portion 12. Two build-up portions 24 are provided in diametrically symmetric relation with respect to the axis of shank portion 14. The aforesaid given distance W, i.e., the width of the recessed portion, which is defined between the undersurface of the head portion 12 and an edge of the build-up portion 24 should preferably be slightly larger than a thickness of a wall of a pressure container 28 for the reason to be described hereinafter (See FIG. 3). Alternatively, the number of build-up portions 24 to be formed on the outer peripheral surface 22 of the shank portion 14 may be increased, as required.

Figure 2:
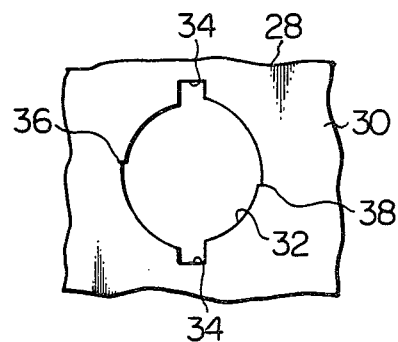
FIG. 2 is a plan view showing part of a pressure container, to which is attached a plug of FIG. 1.

As shown in FIG. 2, a substantially circular plug-attaching hole 32 is provided in a wall 30 of a pressure container, such as an air tank, so as to receive the shank portion 14 therein. Cut-away portion 34 are provided in a peripheral edge portion of the hole 32 in diametrically symmetric relation, as shown, with the size and shapes thereof being complementary to those of the build-up portions 24. The radii of the hole 32 are so designed that the radius of the hole in the beginning quarter starting from the cut-away portion 34, as viewed in the counter-clockwise direction of the hole 32, is substantially equal half the outer diameter of the shank portion 14 and that the radius of the hole in the beginning quarter from the cut-away portion as viewed in the clockwise direction of the hole is gradually reduced, as compared with half the outer diameter of the recessed portion on the shank portion 14. In addition, stepped portions 36 and 38 are provided in a peripheral edge of the hole 32 in the diametrical symmetric relation in the direction at a right angle to the direction of the cut-away portions 34, 34.

Figure 3:
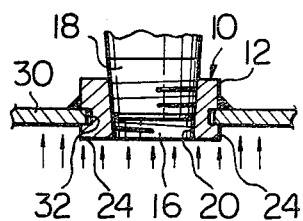
FIG. 3 is a longitudinal cross-sectional view showing an attached condition of the plug of FIG. 1 to a pressure container.

Accordingly, when the shank portion 14 of the plug 10 is inserted into the circular plug-attaching hole 32, with the build-up portions 24 being mated with the cut-away portions 34 provided in the peripheral edge portion of the hole 32 provided in the wall of the pressure container, and then the plug 10 is turned in the clockwise direction, the build-up portions 24 provided on the shank portion 14 of the plug engage the inner peripheral edge surface of the hole 32 in the wall 30 of the container, as shown in FIG. 3. In other words, the wall 30 is sandwiched between the build-up portions 24 and the undersurface of the head portion 12, so that the plug 10 may be positively secured to the wall of the pressure container. In addition, the plug 10 is turned through an angle of about 90° in the clockwise direction, so that the stepped portions 26 may bear against the stepped portions 36, 38 provided in the peripheral edge portion of the hole 32, i.e., the recessed portions in the stepped portions 26 are pressed against the stepped portions 36, 38 formed in the peripheral edge of the hole. However, since the diameter of the hole 32 in this range is gradually reduced, so that the plug 10 may be positively secured in the hole 32, with the shank portion being squeezed by the peripheral edge of the hole 32, before or when the stepped portions 26 abut the stepped portions 36, 38.

After the plug is positioned in the aforesaid manner, the outer peripheral edge of the head portion 12 of the plug 10 is welded or bonded to a peripheral edge of the hole 32 provided in the wall 30 of the pressure container in gas tight manner. In this respect, the plug 10 is positively secured to the hole 32, so that welding may be achieved with ease and good results. A coupling portion 18 of an accessory such as a safety valve, drain cock, lower-pressure switch, blank cap and the like, is screwed into the tapped hole 16.

The plug 10 interposed between the accessory and the pressure container bears a force directed outside of the container under the internal pressure of the container. However, even if a weld around the head portion of the plug is failed or broken due to deterioration, the build-up portions 24 on the plug remain locked by the inner peripheral surface of the hole 32 provided in the wall 30 of the pressure container, thereby preventing the plug 10 from being blown away from the container. It follows from this that even in such an event, gas in the pressure container will not momentarily be bled therefrom but gradually.

According to the plug and plug attaching hole of the invention, the plug may be prevented from being blow away from the pressure container, and as a result gas in the container will not be bled momentarily. Accordingly, the plug and plug attaching hole of the invention find the best application as a plug to be attached to an air tank for use with a pneumatic brake of a motor vehicle, which undergoes consistent vibrations during its running, thereby avoiding a danger or an accident such as when a plug is blown away due to momentary bleeding of gas from the container and hits a pedestrian. In addition, the plug and its attaching hole according to the present invention may be applied to a plug for use in the connection of a pipe to a tank, other than plugs for use in accessories of the type described.

Although the present invention has been described with respect to specific details of an embodiment thereof, it is not intended that such details be limitations upon the scope of the invention except insofar as set forth in the following claims.

What is claimed is:

1. A plug and an attaching hole therefor, in which said plug is interposed between a pressure container and an accessory when removably attaching said accessory to said pressure container, said attaching hole is of a circular shape and provided in the wall of said pressure container, and provided with cut-away portions in the peripheral edge portion of said hole; and said plug includes a head portion and a shank portion continuous with the undersurface of said head portion, with a through-hole running through said head portion and said shank portion, said through-hole receiving a coupling portion of said accessory, said shank portion being formed with build-up portions spaced a given distance from the undersurface of said head portion, on the outer peripheral surface of said shank portion, said cut-away portions having a shape and size complementary to those of said build-up portions, and press fit means for providing a press fit between surfaces of the shank portion and said peripheral edge portion of said hole in a radial direction and for increasing such radial press fit upon turning of the shank portion relative to the hole, the press fit means including surfaces of the peripheral edge portion of the hole which decrease in radius in the direction of turning of the shank portion, said plug including a pair of stepped ridge portions each consisting of the build-up portions and a recessed portion having a radius larger than that of the shank portion but smaller than the head portion, the recessed portion providing the press fit with the peripheral edge portion of the hole, the recessed portion being between the build-up portions and the head portion, whereby upon attachment of said plug to said pressure container, said shank portion of said plug is inserted into said circular plug-attaching hole, with said build-up portions being mated with said cut-away portions, and then turned, after which the outer periphery of said head portion may be secured to the edge portion of said circular plug-attached hole in gas tight manner.

2. A plug and an attaching hole thereof, as set forth in claim 1, wherein a spacing between said build-up portion and the undersurface of said head portion is substantially the same as a wall thickness of said pressure container in the peripheral edge portion of said plug-attaching hole.

3. A plug and an attaching hole thereof, as set forth in claim 1, wherein said cut-away portions are provided in diametrically symmetric relation in the peripheral edge portion of said plug-attaching hole, and said build-up portions are formed on the outer peripheral surface of said shank portion of said plug in diametrically symmetric relation.

4. A plug and an attaching hole thereof as set forth in claim 1, wherein said plug-attaching hole having a radius which is substantially half the outer diameter of said shank portion in the beginning quarter from said cut-away portion, as viewed in either clockwise or counterclockwise direction, and reduced gradually from half the outer diameter of said recessed portion in the beginning quarter from said cut-away portion, as viewed in the other of said clockwise and counterclockwise directions.

5. The invention in accordance with claim 1, wherein the peripheral edge portion of said hole is stepped to prevent further turning of the shank portion.

6. The invention in accordance with claim 1, wherein the peripheral edge portion of said hole is stepped to prevent further turning of the shank portion with the recessed portion adapted to engage with the stepped portion of the hole in cooperating in preventing further turning of the shank relative to the hole.

* * * * *